United States Patent
Babaee et al.

(10) Patent No.: US 10,938,483 B1
(45) Date of Patent: Mar. 2, 2021

(54) TRAINING-AIDED FEEDFORWARD CHANNEL EQUALIZATION

(71) Applicants: Ramin Babaee, Ottawa (CA); Shahab Oveis Gharan, Ottawa (CA); Martin Bouchard, Cantley (CA); Kim B. Roberts, Ottawa (CA)

(72) Inventors: Ramin Babaee, Ottawa (CA); Shahab Oveis Gharan, Ottawa (CA); Martin Bouchard, Cantley (CA); Kim B. Roberts, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 16/903,792

(22) Filed: Jun. 17, 2020

(51) Int. Cl.
*H04B 10/61* (2013.01)
*H04B 10/69* (2013.01)

(52) U.S. Cl.
CPC ....... *H04B 10/6161* (2013.01); *H04B 10/614* (2013.01); *H04B 10/6162* (2013.01); *H04B 10/6971* (2013.01)

(58) Field of Classification Search
CPC .............. H04B 10/6161; H04B 10/614; H04B 10/6971; H04B 10/6162; H04B 10/25133; H04B 10/07951; H04B 10/25; H04B 10/2507; H04B 10/2513; H04B 10/50; H04B 10/505; H04B 10/60; H04B 10/61; H04B 10/616
USPC ......................................................... 398/208
See application file for complete search history.

(56) References Cited

U.S. PATENT DOCUMENTS

| | | | | |
|---|---|---|---|---|
| 7,082,268 B2 * | 7/2006 | Schemmann | ...... | H04B 10/2513 385/11 |
| 7,139,343 B2 * | 11/2006 | Takahashi | ......... | H04L 25/03025 375/350 |
| 8,385,747 B2 * | 2/2013 | Roberts | .............. | H04B 10/2572 398/150 |

(Continued)

OTHER PUBLICATIONS

Cui, et al., "Two-parameter-SOP and three-parameter-RSOP fiber channels: problem and solution for polarization demultiplexing using Stokes space", Optics Express, vol. 26, No. 16, Aug. 6, 2018.
(Continued)

*Primary Examiner* — Abbas H Alagheband
(74) *Attorney, Agent, or Firm* — Integral Intellectual Property Inc.; Amy Scouten; Miriam Paton

(57) ABSTRACT

An optical signal modulated with a stream of symbols comprising a sequence of training symbols is received at a receiver. First equalizer circuitry calculates and applies first coefficients to digital signals representative of the optical signal, thereby resulting in first compensated signals. Second equalizer circuitry calculates second coefficients based on a correlation between the first compensated signals and digital signals representative of the sequence of training symbols and applies the second coefficients to the first compensated signals, thereby resulting in second compensated signals. Third equalizer circuitry calculates and applies third coefficients to the second compensated signals, thereby resulting in third compensated signals. The first, second, and third coefficients compensate for impairments in the optical signal varying at respective first, second, and third rates, where the third rate is higher than the first rate and lower than the second rate.

20 Claims, 7 Drawing Sheets

(56) References Cited

U.S. PATENT DOCUMENTS

| | | | | |
|---|---|---|---|---|
| 8,401,403 B2* | 3/2013 | Rollins | ............... | H04B 10/299 |
| | | | | 398/208 |
| 8,526,508 B2* | 9/2013 | Kim | ................. | H03M 13/2792 |
| | | | | 375/240.27 |
| 8,666,251 B2* | 3/2014 | Zhao | ................. | H04B 10/6971 |
| | | | | 398/81 |
| 8,989,603 B2* | 3/2015 | Shibutani | ........... | H04B 10/6161 |
| | | | | 398/208 |
| 9,094,122 B2* | 7/2015 | Roberts | ............. | H04B 10/2569 |
| 9,590,731 B2* | 3/2017 | Roberts | ............. | H04B 10/2569 |
| 2006/0245766 A1* | 11/2006 | Taylor | ................... | H04B 10/60 |
| | | | | 398/208 |
| 2014/0079408 A1* | 3/2014 | Yan | ................... | H04L 25/03006 |
| | | | | 398/152 |

OTHER PUBLICATIONS

Li, et al., "Real-time fast polarization tracking based on polarization phase locking least mean square algorithm", Optics Express, vol. 27, No. 16, Aug. 5, 2019.

Pittala, et al., "Training-Aided Frequency-Domain Channel Estimation and Equalization for Single-Carrier Coherent Optical Transmission Systems", Journal of Lightwave Technology, vol. 32, No. 24, Dec. 15, 2014.

Zhu, et al., "Digital Signal Processing for Training-Aided Coherent Optical Single-Carrier Frequency-Domain Equalization Systems", Journal of Lightwave Technology, vol. 32, No. 24, Dec. 15, 2014.

* cited by examiner

TRAINING-AIDED FEEDFORWARD CHANNEL EQUALIZATION

TECHNICAL FIELD

This document relates to the technical field of communications.

BACKGROUND

In a communication network, a transmitter may transmit a signal over a communication channel to a receiver, where the signal is representative of digital information in the form of symbols or bits. The receiver may process the signal received over the communication channel to recover estimates of the symbols or bits. Various components of the communication network may contribute to signal degradation, such that the signal received at the receiver comprises a degraded version of the signal that was generated at the transmitter. In the case of an optical signal, degradation or distortion may be caused by polarization mode dispersion (PMD), polarization dependent loss or gain (PDL or PDG), state of polarization (SOP) rotation, amplified spontaneous emission (ASE), wavelength-dependent dispersion or chromatic dispersion (CD), and other effects. The degree of signal degradation may be characterized by a signal-to-noise ratio (SNR), or alternatively by a noise-to-signal ratio (NSR).

The degradation and/or distortion observed in the received signal depends on the condition of the communication channel over which the signal is received. The condition of the communication channel may be characterized by the channel response, which may vary over time. By tracking time-varying changes in the channel response, it may be possible to compensate for those changes in the received signal, a process generally referred to as channel equalization.

SUMMARY

According to a broad aspect, a receiver device is configured to receive an optical signal modulated with a stream of symbols comprising a sequence of training symbols. The receiver device comprises first equalizer circuitry configured to calculate first coefficients and to apply the first coefficients to digital signals representative of the optical signal, thereby resulting in first compensated signals. The receiver device further comprises second equalizer circuitry configured to calculate second coefficients based on a correlation between the first compensated signals and digital signals representative of the sequence of training symbols and to apply the second coefficients to the first compensated signals, thereby resulting in second compensated signals. The receiver device further comprises third equalizer circuitry configured to calculate third coefficients and to apply the third coefficients to the second compensated signals, thereby resulting in third compensated signals. The first, second, and third coefficients compensate for impairments in the optical signal varying at respective first, second, and third rates, where the third rate is higher than the first rate and lower than the second rate.

According to some examples, the impairments varying at the first rate comprise chromatic dispersion (CD).

According to some examples, the impairments varying at the second rate comprise state of polarization (SOP) transients.

According to some examples, the impairments varying at the third rate comprise polarization mode dispersion (PMD).

According to some examples, the first rate is lower than 1 Hz, the second rate is higher than 1 MHz, and the third rate is approximately 1 kHz.

According to some examples, the first, second, and third equalizer circuitry are configured to apply the respective first, second, and third coefficients using frequency-domain linear filtering.

According to some examples, the training symbols are uniformly distributed within each burst.

According to some examples, the second equalizer circuitry is configured to apply the second coefficients to the first compensated signals non-causally.

According to some examples, the second coefficients comprise N 2×2 matrices corresponding to N respective frequency bins of the first compensated signals, where N is an integer greater than or equal to two.

According to some examples, the second equalizer circuitry is configured to calculate the correlation in the frequency domain.

DETAILED DESCRIPTION

Figure 1:
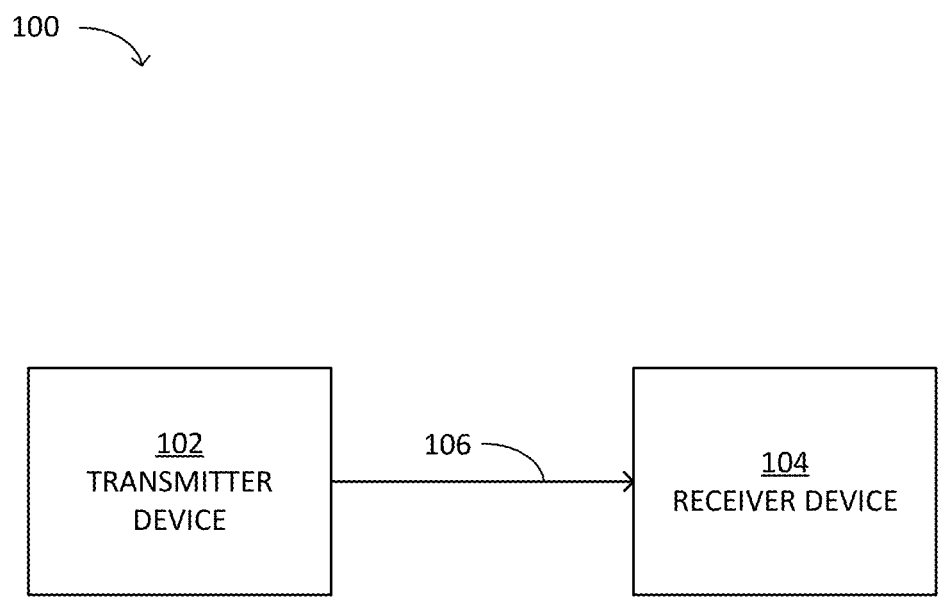
FIG. 1 illustrates an example communication network in accordance with some examples of the technology disclosed herein.

FIG. 1 illustrates an example communication network 100, in accordance with some examples of the technology disclosed herein.

The communication network 100 may comprise at least one transmitter device 102 and at least one receiver device 104, where the transmitter device 102 is capable of transmitting signals over a communication channel, such as a communication channel 106, and where the receiver device 104 is capable of receiving signals over a communication channel, such as the communication channel 106. According to some examples, the transmitter device 102 is also capable of receiving signals. According to some examples, the receiver device 104 is also capable of transmitting signals. Thus, one or both of the transmitter device 102 and the receiver device 104 may be capable of acting as a transceiver. According to one example, the transceiver may comprise a modem.

The communication network 100 may comprise additional elements not illustrated in FIG. 1. For example, the communication network 100 may comprise one or more additional transmitter devices, one or more additional receiver devices, and one or more other devices or elements involved in the communication of signals in the communication network 100.

According to some examples, the signals that are transmitted and received in the communication network 100 may comprise any combination of electrical signals, optical signals, and wireless signals. For example, the transmitter device 102 may comprise a first optical transceiver, the receiver device 104 may comprise a second optical transceiver, and the communication channel 106 may comprise an optical communication channel. According to one example, one or both of the first optical transceiver and the second optical transceiver may comprise a coherent modem.

Each optical communication channel in the communication network 100 may include one or more links, where each link may comprise one or more spans, and each span may comprise a length of optical fiber and one or more optical amplifiers.

Where the communication network 100 involves the transmission of optical signals, the communication network 100 may comprise additional optical elements not illustrated in FIG. 1, such as wavelength selective switches, optical multiplexers, optical de-multiplexers, optical filters, and the like.

Various elements and effects in the communication network 100 may result in the degradation of signals transmitted between different devices. Thus, a signal received at the receiver device 104 may comprise a degraded version of a signal transmitted by the transmitter device 102, where the degradation is caused by various impairments in the communication channel 106. For example, where the communication channel 106 is an optical communication channel, the signal transmitted by the transmitter device 102 may be degraded by polarization mode dispersion (PMD), polarization dependent loss or gain (PDL or PDG), state of polarization (SOP) rotation, amplified spontaneous emission (ASE) noise, and wavelength-dependent dispersion or chromatic dispersion (CD), nonlinear noise from propagation through fiber, and other effects. The degree of signal degradation may be characterized by a signal-to-noise ratio (SNR), or alternatively by a noise-to-signal ratio (NSR). The signals transmitted in the communication network 100 may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

The receiver device 104 may receive a communication signal transmitted over the communication channel 106 from the transmitter device 102, where the communication signal conveys symbols that are representative of digital information. At the receiver device 104, the decoded symbols that are recovered may comprise noisy versions of the symbols that were originally transmitted by the transmitter device 102.

Figure 2:
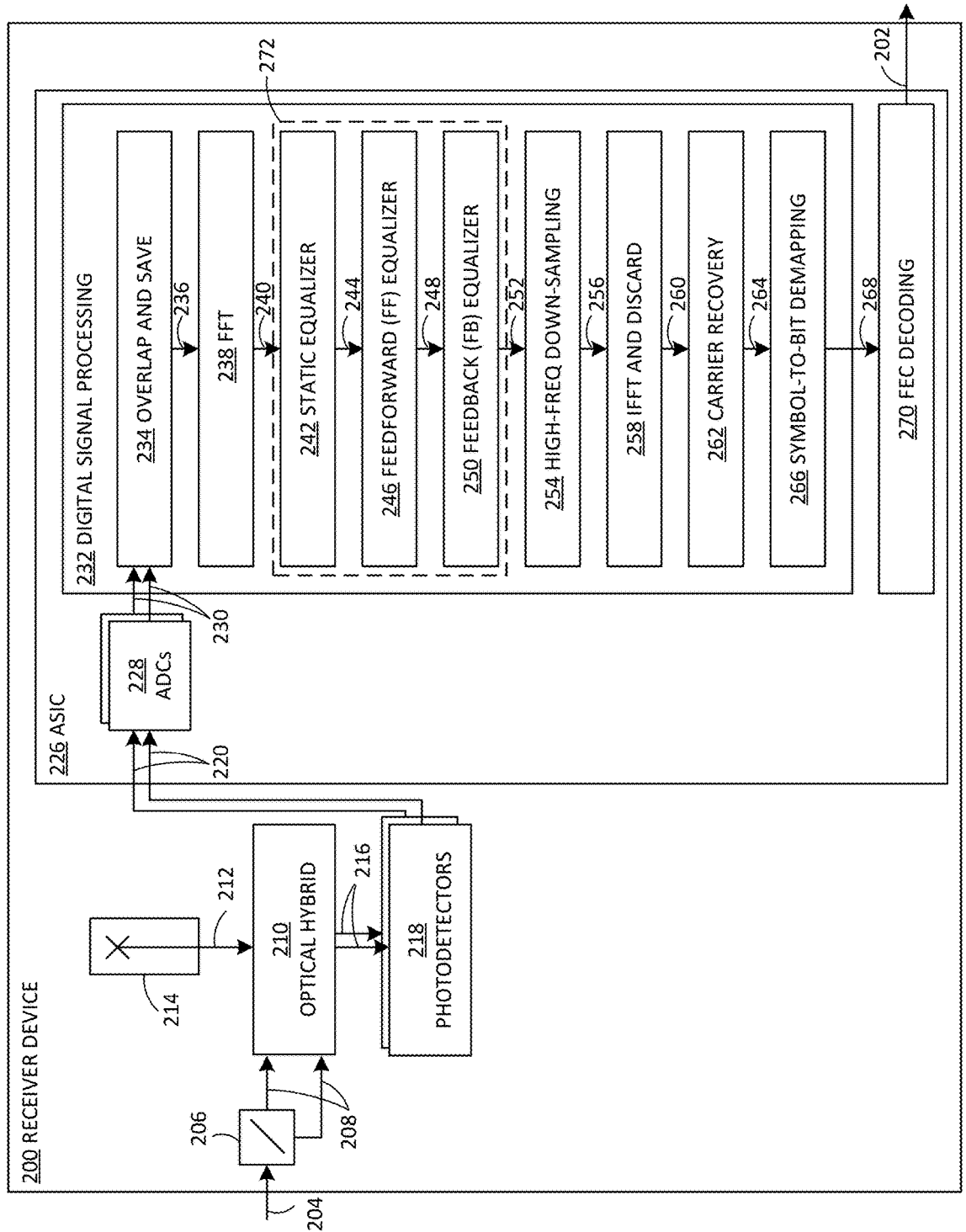
FIG. 2 illustrates an example receiver device in accordance with some examples of the technology disclosed herein.

FIG. 2 illustrates an example receiver device 200, in accordance with some examples of the technology disclosed herein. The receiver device 200 is an example of the receiver device 104. The receiver device 200 may comprise additional components that are not described in this document.

The receiver device 200 is configured to receive an optical signal 204, which may comprise a degraded version of an optical signal generated by a transmitter device, such as the transmitter device 102. The optical signal generated by the transmitter device may be representative of information bits (also referred to as client bits) which are to be communicated to the receiver device 200. The optical signal generated by the transmitter device may be representative of a stream of symbols comprising payload symbols and a known sequence of training symbols, where the training symbols are distributed over time and may be used for various operations within the receiver device 200, such as clock recovery and compensation of channel impairments.

According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques such as polarization-division multiplexing (PDM), single polarization modulation, modulation of an unpolarized carrier, mode-division multiplexing, spatial-division multiplexing, Stokes-space modulation, polarization balanced modulation, and the like.

The receiver device 200 is configured to recover corrected client bits 202 from the received optical signal 204. The receiver device 200 may comprise a polarizing beam splitter 206 configured to split the received optical signal 204 into polarized components 208. According to one example, the polarized components 208 may comprise orthogonally polarized components corresponding to an X polarization and a Y polarization. An optical hybrid 210 is configured to process the components 208 with respect to an optical signal 212 produced by a laser 214, thereby resulting in optical signals 216. Photodetectors 218 are configured to convert the optical signals 216 output by the optical hybrid 210 to analog signals 220. According to one example, the analog signals 220 may comprise four signals corresponding, respectively, to the dimensions XI, XQ, YI, YQ, where XI and XQ denote the in-phase (I) and quadrature (Q) components of the X polarization, and YI and YQ denote the I and Q components of the Y polarization. Together, elements such as the beam splitter 206, the laser 214, the optical hybrid 210 and the photodetector 218 may form a communication interface configured to receive optical signals from other devices in a communication network, such as the network 100.

The receiver device 200 may comprise an application specific integrated circuit (ASIC) 226. The ASIC 226 may comprise analog-to-digital converters (ADCs) 228 which are configured to sample the analog signals 220, and to generate respective digital signals 230. Although illustrated as comprised in the ASIC 226, in an alternate implementation the ADCs 228 or portions thereof may be separate from the ASIC 226. The ADCs 228 sample the analog signals 220 periodically at a sample rate that is based on a signal received from a voltage-controlled oscillator (VCO) at the receiver device 200 (not shown).

The ASIC 226 is configured to apply digital signal processing 232 to the digital signals 230. The digital signals 230 corresponding to the X and Y polarizations may be denoted by $r_x(n)$ and $r_y(n)$, respectively, where n denotes time. According to some examples, the processing 232 may comprise transforming the digital signals 230 from the time domain to the frequency domain. An overlap and save (OAS) operation 234 may be applied to the digital signals, and the resulting output signals 236 may then undergo a fast Fourier transform (FFT) operation 238 to generate discrete frequency-domain signals 240. The frequency-domain signals 240 corresponding to the X and Y polarizations may be denoted $R_x(f_i)$ and $R_y(f_i)$, respectively, for i=1 . . . , where N is an integer greater than or equal to two that denotes the total number of frequency bins, and where $f_i$ denotes the $i^{th}$ frequency bin. Each of $R_x(f_i)$ and $R_y(f_i)$ may comprise a complex value that represents both I and Q components.

The frequency-domain signals 240 may undergo an equalization process 272 which is designed to compensate for a variety of channel impairments, such as CD, SOP rotation, PMD including group delay (GD) and differential group delay (DGD), PDL or PDG, and other effects. The signals 252 output by the equalization process 272 may undergo high-frequency down-sampling 254. The resulting down-sampled signals 256 may be transformed to corresponding time-domain signals 260 using an inverse fast Fourier transform (IFFT) and discard operation 258. Although the equalization process 272 is illustrated as being performed in the frequency domain, it is contemplated that portions of this process may alternatively be performed in the time domain.

The time-domain signals 260 output by the IFFT and discard operation 258 may undergo carrier recovery 262, which includes calculating an estimate of carrier frequency offset (i.e., the difference between the frequency of the transmitter laser and the frequency of the receiver laser 214). Following the carrier recovery 262, the resulting signals 264 are representative of decoded symbols. The signals 264 undergo symbol-to-bit demapping 266 using a decision circuit, thereby resulting in signals 268 which are representative of bit estimates. Where the received optical signal 204 is representative of symbols comprising FEC-encoded bits generated as a result of applying FEC encoding to client bits, the signals 268 may further undergo FEC decoding 270 to recover the corrected client bits 202.

Although not illustrated in FIG. 2, the processing 232 may include additional operations such as multiple-output (MIMO) filtering, clock recovery, and FDM subcarrier de-multiplexing.

According to some examples, the equalization process 272 may comprise one or more equalizers, where each equalizer is configured to compensate for impairments in the channel response. In general, an equalizer applies a filter to an input signal to generate an output signal that is less degraded than the input signal. The filter is characterized by compensation coefficients which may be incrementally updated from time to time, always with the goal of reducing the degradation observed in the output signal.

Various methods for equalization have been described. For example, in "Digital signal processing for training-aided coherent optical single-carrier frequency-domain equalization systems", *Journal of Lightwave Technology*, vol. 32, December 2014, Zhu et al. propose extracting training symbols after correcting carrier frequency offset, and then using the training symbols for estimation of the channel response. A time-domain rectangular window is used to limit noise in the channel response estimate. Based on the estimated channel response, the received signal is equalized in the frequency domain. In "Training-aided frequency-domain channel estimation and equalization for single-carrier coherent optical transmission systems," *Journal of Lightwave Technology*, vol. 32, December 2014, Pittal'a et al. propose a dual stage equalizer. The first stage involves CD compensation in the frequency domain. The results are transformed into the time domain via IFFT. Training symbols are then extracted, and the signal brought back to the frequency domain for channel equalization. In "Two-parameter-SOP and three-parameter-RSOP fiber channels: problem and solution for polarization demultiplexing using stokes space", *Optics Express*, vol. 26, August 2018, Cui et al. propose an extended Kalman filter approach for SOP tracking. In "Real-time fast polarization tracking based on polarization phase locking least mean square algorithm", *Optics Express*, vol. 27, August 2019, Li et al. propose a time-domain feedforward LMS algorithm based on the phase locking of X and Y polarization training symbols.

In U.S. Pat. Nos. 8,005,368, 8,385,747, 9,094,122, and 9,590,731, herein incorporated by reference, to Roberts et al. propose an equalizer for a coherent optical modem wherein the received signal is equalized by two sets of coefficients.

According to some examples of the technology described herein, the equalization process 272 comprises a series of three equalizers: a static equalizer 242, a feedforward (FF) equalizer 246, and a feedback (FB) equalizer 250.

The static equalizer 242 may be applied to the discrete frequency-domain signals 240, denoted $R_x(f_i)$ and $R_y(f_i)$, to generate respective discrete frequency-domain signals 244, denoted $R_{x1}(f_i)$ and $R_{y1}(f_i)$. The FF equalizer 246 may be applied to the discrete frequency-domain signals 244 output by the static equalizer 242, thereby resulting in respective discrete frequency-domain signals 248, denoted by complex values $R_{x12}(f_i)$ and $R_{y12}(f_i)$. The FB equalizer 250 may be applied to the discrete frequency-domain signals 248 output by the FF equalizer 246, thereby resulting in respective discrete frequency-domain signals 252, denoted by complex values $R_{x123}(f_i)$ and $R_{y123}(f_i)$.

Figure 3:
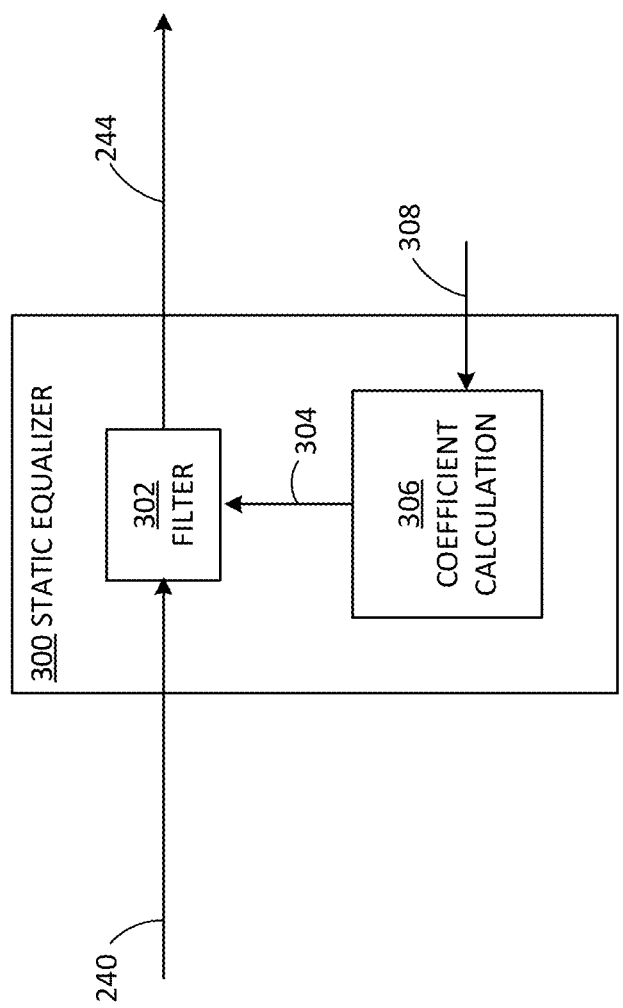
FIG. 3 illustrates an example static equalizer in accordance with some examples of the technology disclosed herein.

FIG. 3 illustrates an example static equalizer 300 in accordance with some examples of the technology disclosed herein. The static equalizer 300 is an example of the static equalizer 242 shown in FIG. 2.

The static equalizer 300 may comprise a filter 302 which is characterized by compensation coefficients 304, which may be calculated using a coefficient calculation operation 306. The output signals 244 may be calculated by taking the product of the input signals 240 and the respective compensation coefficients 304 of the filter 302. For example, where the compensation coefficients 304 are denoted by complex values $C1_x(f_i)$ and $C1_y(f_i)$, then the output signals 244 may be calculated according to Eq. 1:

$$R_{x1}(f_i)=C1_x(f_i)\cdot R_x(f_i)$$

$$R_{y1}(f_i)=C1_y(f_i)\cdot R_y(f_i), \qquad [1]$$

where $R_{x1}(f_i)$ and $R_{y1}(f_i)$ denote the output signals 244, where i=1 . . . N, and where N denotes the total number of frequency bins of the input signals 240.

The compensation coefficients 304 may be calculated through firmware using the estimated CD during start-up of the receiver device (also referred to as the acquisition stage). According to some examples, the compensation coefficients 304 may be calculated to apply a first-order dispersive function to at least partially compensate CD in channel. According to some examples, information 308 generated by the FB equalizer 250 may be used to periodically update the values of the compensation coefficients $C1_x(f_i)$ and $C1_y(f_i)$, for example, once every second. For example, the FB equalizer 250 may generate estimates of residual CD, residual GD, and the general shape of the filter response of the FB equalizer 250. The frequency response of these impairments may be transferred to the static equalizer 300 gradually over time.

Because the updating of the compensation coefficients 304 is relatively infrequent (compared to the equalizers 246 and 250, for example), the equalizer 300 may generally be described as "static." The slow rate of change of the compensation coefficients 304 means that the static equalizer 300 is only capable of tracking and compensating for relatively slow changes in the channel response, and not fast changes. For example, the equalizer 300 may be able to compensate for changes in CD, which are typically at a rate on the order of <1 Hz, but the equalizer 300 may be unable to compensate for changes in SOP rotation, which typically happen much more quickly.

Figure 4:
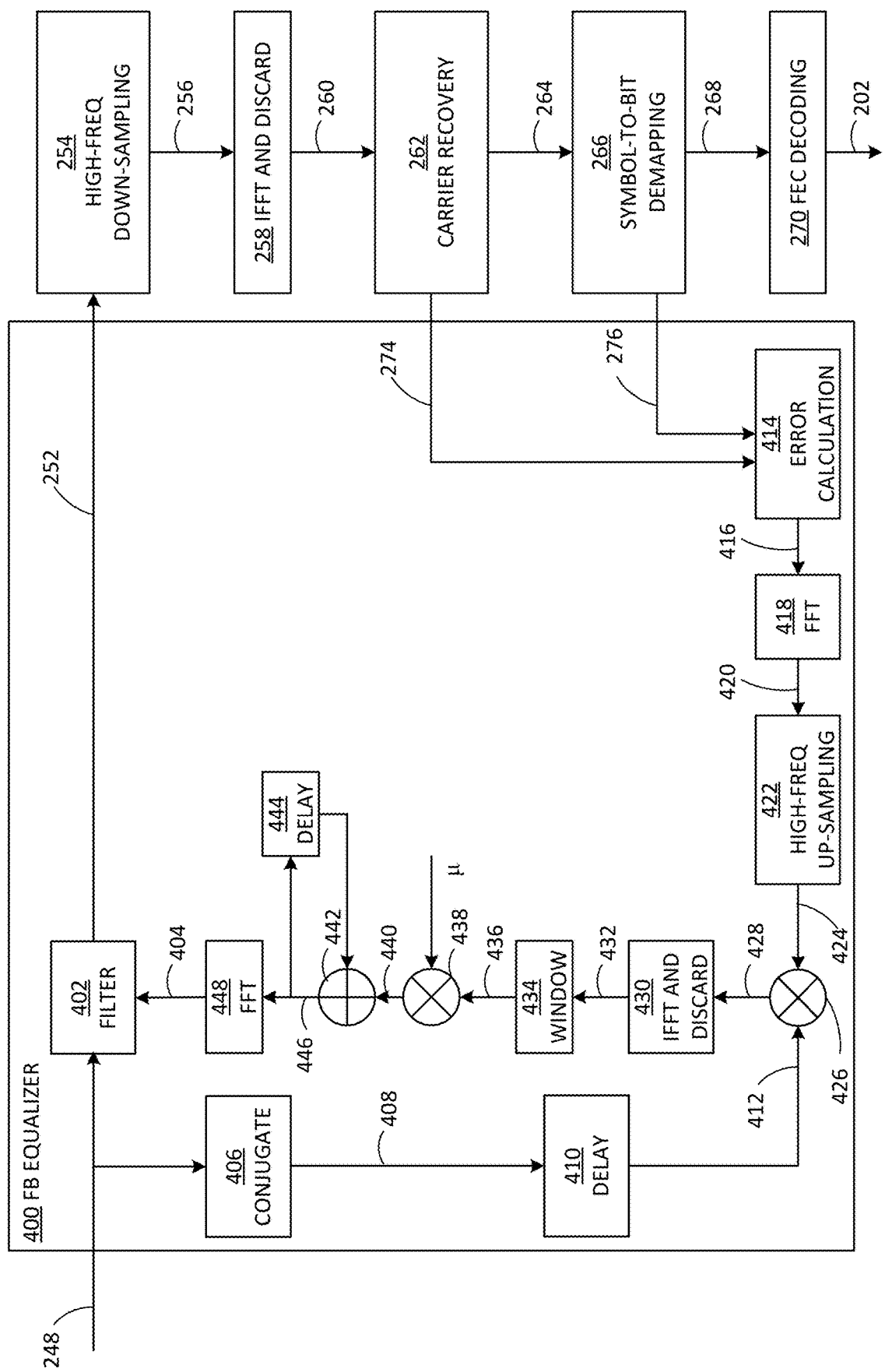
FIG. 4 illustrates an example feedback (FB) equalizer in accordance with some examples of the technology disclosed herein.

FIG. 4 illustrates an example FB equalizer 400 in accordance with some examples of the technology disclosed herein. The FB equalizer 400 is an example of the FB equalizer 250 shown in FIG. 2.

According to some examples, the FB equalizer 400 may rely on a Least Mean Squares (LMS) feedback loop. The FB equalizer 400 may apply a filter 402 to the input signals 248, thereby resulting in respective output signals 252. The filter 402 is characterized by compensation coefficients 404 denoted by complex values $C3_{xx}(f_i)$, $C3_{xy}(f_i)$, $C3_{yx}(f_i)$, and $C3_{yy}(f_i)$, for i=1 . . . N. The output signals 252 may be calculated from the product of the input signals 244 and the respective compensation coefficients 404 of the filter 402. Thus, for each of the i=1 . . . N frequency bins, the output signals 252 may be calculated according to Eq. 2:

$$\begin{bmatrix} R_{x123}(f_i) \\ R_{y123}(f_i) \end{bmatrix} = \begin{bmatrix} C3_{xx}(f_i) & C3_{xy}(f_i) \\ C3_{yx}(f_i) & C3_{yy}(f_i) \end{bmatrix} \begin{bmatrix} R_{x12}(f_i) \\ R_{y12}(f_i) \end{bmatrix}. \quad [2]$$

As will now be described in more detail, the values of the compensation coefficients 404 may be periodically and incrementally adjusted based on feedback about the errors on the symbols that are currently being decoded at the receiver device 200, where the adjustments are calculated so as to minimize these errors.

According to some examples, the FB equalizer 400 may comprise an error calculation operation 414 which calculates the difference between the received symbols 274 as determined at the carrier recovery 262 and the symbols that correspond to the bits 276 output by the symbol-to-bit demapping 266. The error calculation operation 414 may generate time-domain error signals 416 which are representative of these errors. A FFT operation 418 may be used to transform the time-domain error signals 416 to corresponding frequency-domain error signals 420, followed by high-frequency upsampling 422 to generate error signals 424, denoted $E_x(f_i)$ and $E_y(f_i)$.

Meanwhile, a complex conjugate operation 406 may be applied to the frequency-domain input signals 248, thereby resulting in respective frequency-domain conjugate signals 408. A delay operation 410 may be applied to the frequency-domain conjugate signals 408, thereby resulting in delayed frequency-domain conjugate signals 412, denoted by $R_{x12}*(f_i)$ and $R_{y12}*(f_i)$. Ultimately, the error signals 424 are intended to be multiplied by the conjugate signals 412 that correspond to the same clock cycle from which the error signals 424 were calculated. Accordingly, the delay operation 410 may be designed such that it is equivalent to a number of clock cycles needed to perform the operations 254, 258, 262, 266, 414, 418, and 422.

The delayed frequency-domain conjugate signals 412 are multiplied by the respective frequency-domain error signals 424, as denoted by multiplication operation 426, thereby resulting in signals 428, which are denoted $E_x(f_i)R_{x12}*(f_i)$ and $E_y(f_i)R_{y12}*(f_i)$.

According to some examples, an IFFT and discard operation 430 may be applied to the signals 428 to transform them into corresponding time-domain signals 432. According to some examples, the SNR of the signals 432 may be improved using a time-domain window 434 as described, for example, in U.S. Pat. Nos. 8,385,747, 9,094,122, and 9,590,731, thereby resulting in windowed signals 436. Other filtering may be used instead of or in addition to the time-domain window 434. The windowed signals 436 may then be multiplied by a gain factor μ, as denoted by the multiplication operation 438. The resulting signals 440 are time-domain representations of the adjustments to be made to the compensation coefficients 404. The adjustments 440 are incorporated by adding them to the most recent values of the compensation coefficients, which is achieved through an addition operation 442 and a delay operation 444. The resulting signals 446 are time-domain representations of the updated compensation coefficients to be applied at the filter 402. A FFT operation 448 is used to transform the signals 446 into the frequency-domain, thereby resulting in the updated compensation coefficients 404.

According to some examples, the FB equalizer 400 may compensate for relatively fast changes in the channel response, such as SOP changes, PMD changes, PDL changes, small amounts of CD, and analog characteristics of the transmitter and receiver, which change at a rate on the order of kHz. For example, the FB equalizer 400 may compensate for impairments varying at a rate of approximately 1 kHz.

Due to the inherent design of the FB equalizer 400, the coefficients 404 that the filter 402 applies to the signals 248 at a given time t are necessarily calculated based on the values of the signals 248 at a prior time t−D, where D is the amount of time it takes to complete the feedback loop. According to one example, D may have a duration of around 50 FFT blocks. As a result, the FB equalizer 400 may be unable to track very fast changes in the channel response.

Multiple studies have shown a high correlation between fast SOP rotation and mechanical vibrations or lightning strikes. For example, the SOP angular velocity may reach 5.1 MRad/s in the case of a lightning strike around an optical ground wire (OPGW) link. The static equalizer 300 and the FB equalizer 400 may be unable to track these SOP transients and other very fast changes in channel response. Accordingly, it may be desirable for the received signals to undergo further equalization processing that is able to compensate for faster changes in the channel response than either one of the static equalizer 300 or the FB equalizer 400.

Figure 5:
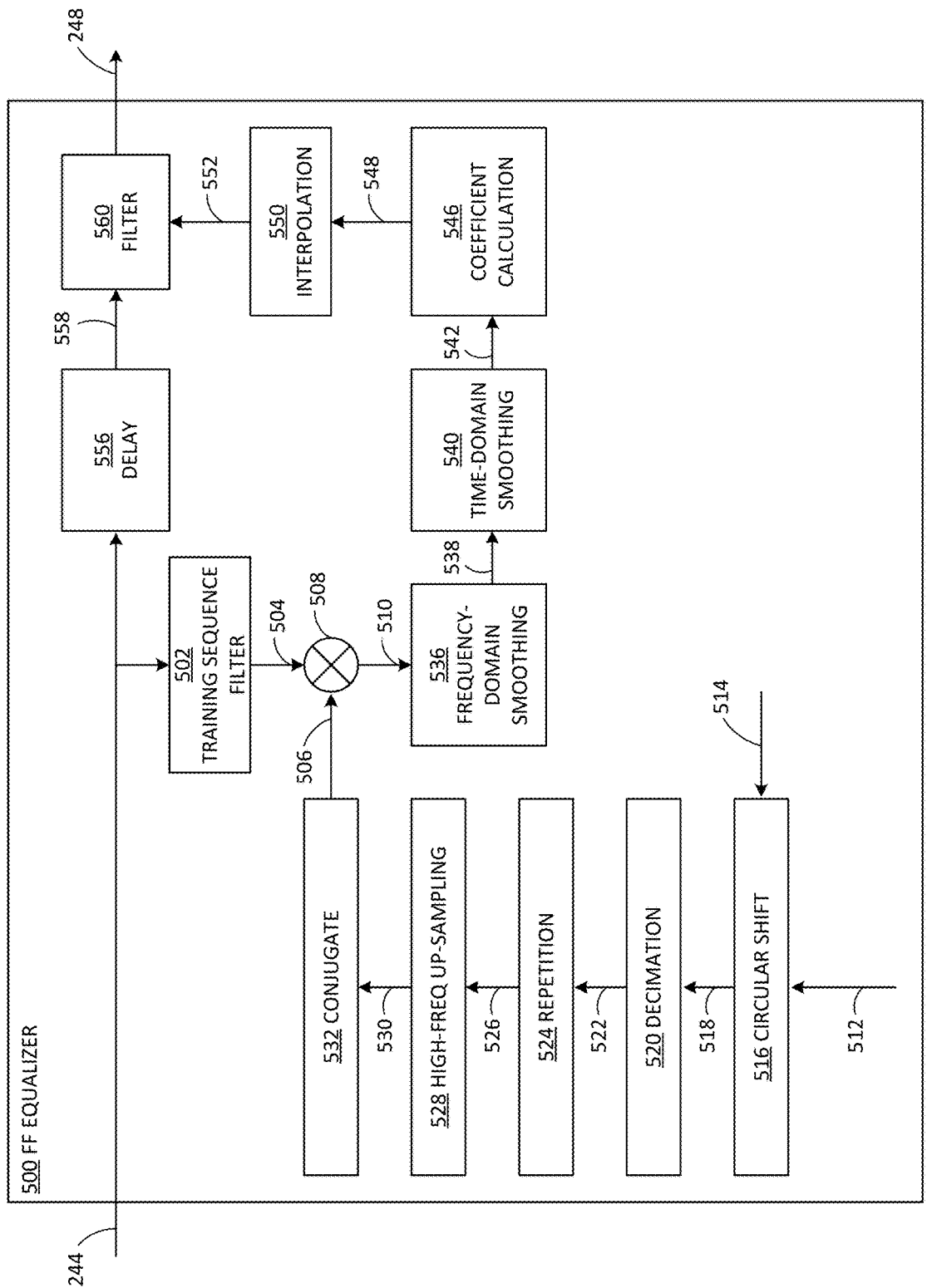
FIG. 5 illustrates an example feedforward (FF) equalizer in accordance with some examples of the technology disclosed herein.

FIG. 5 illustrates an example FF equalizer 500 in accordance with some examples of the technology disclosed herein. The FF equalizer 500 is an example of the FF equalizer 246 shown in FIG. 2.

The input signals 244, denoted by $R_{x1}(f_i)$ and $R_{y1}(f_i)$, may undergo a delay operation 556, thereby resulting in delayed input signals 558. The FF equalizer 500 applies a filter 560 to the delayed input signals 558, thereby resulting in respective output signals 248, which may be denoted by $R_{x12}(f_i)$ and $R_{y12}(f_i)$. The filter 560 is characterized by compensation coefficients 552 denoted by complex values $C2_{xx}(f_i)$, $C2_{xy}(f_i)$, $C2_{yx}(f_i)$, and $C2_{yy}(f_i)$, for i=1 . . . N. The output signals 248 may be calculated from the product of the delayed input signals 558 and the respective compensation coefficients 552 of the filter 560. Thus, for each of the i=1 . . . N frequency bins, the output signals 548 may be calculated according to Eq. 3:

$$\begin{bmatrix} R_{x12}(f_i) \\ R_{y12}(f_i) \end{bmatrix} = \begin{bmatrix} C2_{xx}(f_i) & C2_{xy}(f_i) \\ C2_{yx}(f_i) & C2_{yy}(f_i) \end{bmatrix} \begin{bmatrix} R_{x1}(f_i) \\ R_{y1}(f_i) \end{bmatrix}. \quad [3]$$

Similarly to the compensation coefficients 404 used in the FB equalizer 400, the values of the compensation coefficients 552 used in the FF equalizer 500 may be periodically and incrementally adjusted. However, in contrast to the feedback structure of the FB equalizer 400, the FF equalizer 500 relies on a feedforward structure. Consequently, the compensation coefficients 552 are updated based on current information about the signals 558 to which the filter 560 is being applied.

In order to select appropriate complex values to use for the compensation coefficients 304, an estimate of the channel response is needed. This estimate may be based on a mathematical model which takes into account linear impairments including GD, CD, PMD, PDL or PDG, and SOP.

Figure 6:
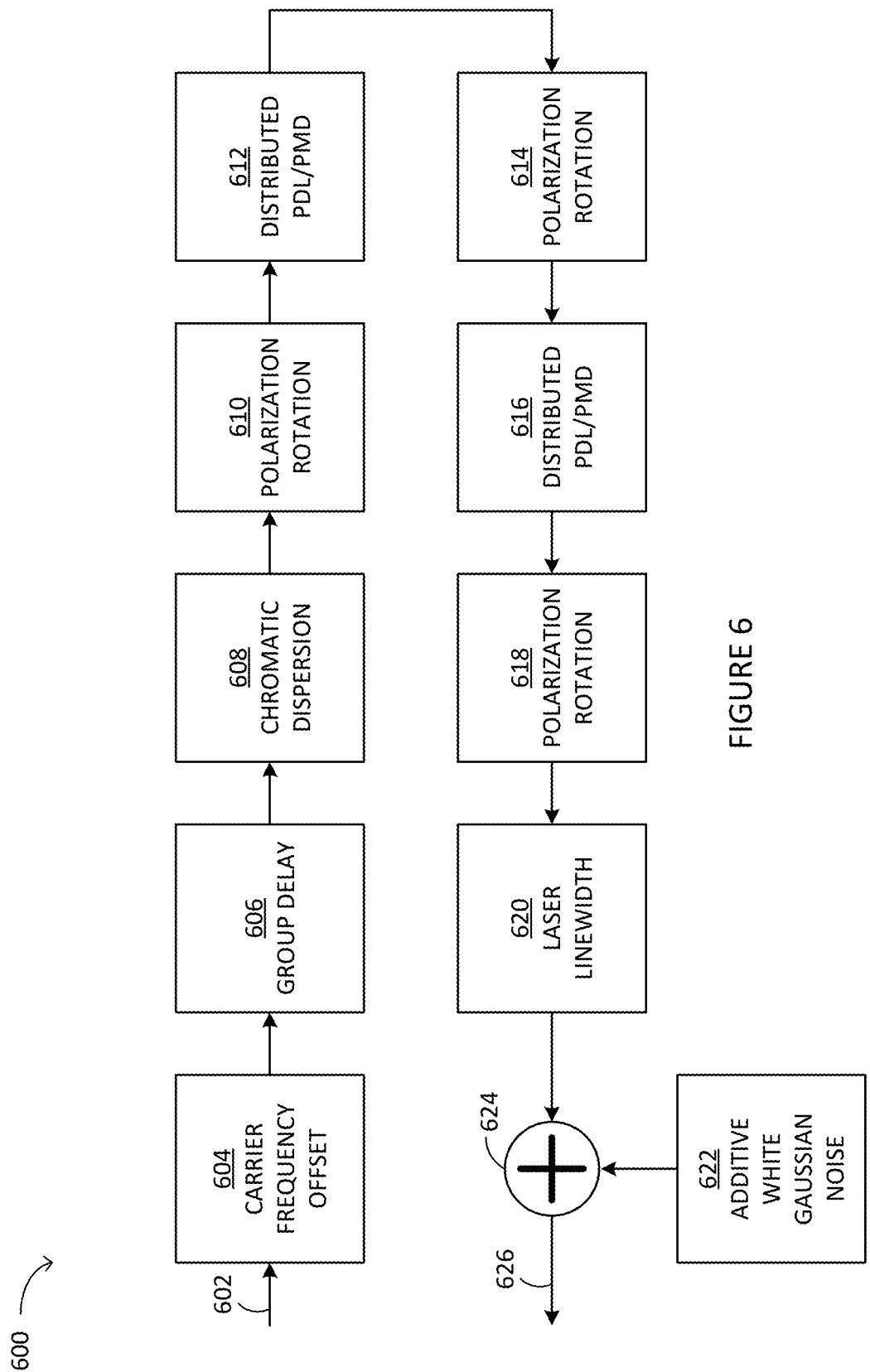
FIG. 6 illustrates an example model representing linear impairments incurred by an optical signal transmitted on a fiber between a transmitter and a receiver.

FIG. 6 illustrates an example model 600 representing linear impairments incurred by an optical signal transmitted over a channel between a transmitter and a receiver.

A signal 626 detected at the receiver may be represented as a function of a signal 602 generated at the transmitter. This function, also referred to as the transfer function for the channel or the channel response, is based on the combined effects of the linear impairments that are taken into account by the model 600. These impairments include carrier frequency offset 604, group delay (GD) 606, chromatic dispersion (CD) 608, polarization rotation 610, 614, and 618, distributed polarization dependent loss (PDL) and polarization mode dispersion (PMD) 612 and 616, laser linewidth impairments 620, and additive white Gaussian noise (AWGN) 622, where the addition of the AWGN 622 is denoted by 624.

According to the model 600, PDL and PMD are distributed along the fiber by splitting the PDL/PMD impairments into two separate segments 612 and 616. Alternative models are contemplated that would split the PDL/PMD into more than two segments. The impairments due to polarization rotation are distributed along the channel, such that 610 reflects the polarization rotation incurred close to the transmitter, 618 reflects the polarization rotation incurred close to the receiver, and 614 reflects the polarization rotation incurred substantially equidistant between the transmitter and the receiver. Accordingly, the PDL/PMD segment 612 accounts for the effects incurred after polarization rotation 610, while the PDL/PMD segment 616 accounts for the additional effects incurred after the polarization rotation 614. The two PDL/PMD segments 612 and 616 may be concatenated together to form a transfer function reflecting the distributed effects of PDL and PMD along the fiber. Additional transfer functions may be derived reflecting the carrier frequency offset 604, the GD 606, the CD 608, the total polarization rotation 610, 614, and 618, and the laser linewidth impairments 620. An overall channel response associated with the model 600 may be derived by combining the individual transfer functions and adding the AWGN.

Referring again to FIG. 5, in the discrete frequency domain, the relationship between the input signals 244, denoted by $R_{x1}(f_i)$ and $R_{y1}(f_i)$, and respective transmitted signals $T_x(f_i)$ and $T_y(f_i)$ transmitted by a transmitter, such as the transmitter device 102, may be represented by Eq. 4:

$$\begin{bmatrix} R_{x1}(f_i) \\ R_{y1}(f_i) \end{bmatrix} = \begin{bmatrix} H_{xx}(f_i) & H_{xy}(f_i) \\ H_{yx}(f_i) & H_{yy}(f_i) \end{bmatrix} \begin{bmatrix} T_x(f_i) \\ T_y(f_i) \end{bmatrix} + \begin{bmatrix} N_x(f_i) \\ N_y(f_i) \end{bmatrix}, \qquad [4]$$

where $H_{xx}(f_i)$, $H_{xy}(f_i)$, $H_{yx}(f_i)$, and $H_{yy}(f_i)$ denote the combined effects of the transfer functions representing the distributed PDL/PMD, the carrier frequency offset, the GD, the CD, the polarization rotation, and the laser linewidth impairments in accordance with the model 600, and where $N_x(f_i)$ and $N_y(f_i)$ denote uncorrelated zero-mean white Gaussian noise with a variance of $\sigma_N^2$ in the X and Y polarizations, respectively, representing the AWGN in accordance with the model 600.

As previously described with respect to FIG. 2, the optical signal 204 received at the receiver device 200 may be representative of both payload symbols and known training symbols. Accordingly, the transmitted signals $T_x(f_i)$ and $T_y(f_i)$ may be represented by Eq. 5:

$$T_x(f_i) = S_x(f_i) + M_x(f_i)$$

$$T_y(f_i) = S_y(f_i) + M_y(f_i), \qquad [5]$$

where $S_x(f_i)$ and $S_y(f_i)$ denote the FFT windowed transmitted signals that only contain training symbols with payload symbols set to zero, and where $M_x(f_i)$ and $M_y(f_i)$ denote the FFT of the transmitted signals with the training symbols set to zero.

According to some examples, the training symbols may be distributed uniformly in time. For example, the number of payload symbols between two consecutive training symbols may be equal to P−1, where $P=N_{burst}/N_{train}$, where $N_{train}$ denotes a number of training symbols, and where $N_{burst}$ denotes burst size. The term "burst" may be used to refer to a contiguous sequence of symbols within which a pattern of training symbols has one repetition. According to some examples, a frame may comprise an integer number of bursts. In one example, where $N_{burst}=1024$ and $N_{train}=32$, the number of payload symbols between two consecutive training symbols is P−1=31.

Under the condition that the training symbols are uniformly distributed in time, and assuming for simplicity that the training symbols in the X and Y polarizations are orthogonal and have the same average energy $\sigma_s^2$ per symbol, and that $N_c$ is an integer multiple of P, a least squares (LS) estimate of the channel response over a narrow range of $N_c$ frequency bins may be calculated using Eq. 6:

$$\begin{bmatrix} H_{xx}(f_i) & H_{xy}(f_i) \\ H_{yx}(f_i) & H_{yy}(f_i) \end{bmatrix}_{LS} = \frac{P}{N_c \sigma_s^2} \begin{bmatrix} R_{x1}(f_i) \\ R_{y1}(f_i) \end{bmatrix}^T \begin{bmatrix} S_x(f_i) \\ S_y(f_i) \end{bmatrix}^*. \qquad [6]$$

Therefore, an estimate of the channel response may be calculated based on a frequency-domain multiplication of the received signals $R_{x1}(f_i)$ and $R_{y1}(f_i)$ and the respective training symbol signals $S_x(f_i)$ and $S_y(f_i)$. It is noted that a frequency-domain multiplication is equivalent to a time-domain cross-correlation.

In FIG. 5, the multiplication in Eq. 6 is achieved by a multiplication operation 508. In order to improve SNR, the received signals 244 may first be filtered to remove as much of the payload symbols as possible. A training sequence filter 502 may be applied to the received signals 244 to generate respective filtered received signals 504. According to some examples, the training sequence filter 502 may correspond to a time-domain windowing function, such as a wide sinc or sinc² pulse, where the magnitude of the function is at a maximum at the training symbol locations and slowly decreases until it reaches a minimum at the payload symbols in the middle of two consecutive training symbols.

According to one example, in the discrete frequency domain, the filter 502 may be represented by Eq. 7:

$$W_s(f_i) = \frac{f_s}{PW} \sum_{k=-\lfloor\frac{PW}{2}\rfloor}^{\lfloor\frac{PW}{2}\rfloor} \delta\left(f_i - k\frac{f_s}{P}\right), \quad [7]$$

where W denotes a constant and where $f_s$ denotes the sampling frequency. The training sequence filter $W_s(f_i)$ in Eq. 7 may be implemented by adders in the frequency domain. The filtered received signals 504 may be calculated by performing a circular convolution or a linear convolution of the training sequence filter 502 and the received signals 244.

The filtered received signals 504 may be multiplied by respective training symbol signals 506, as denoted by the multiplication operation 508. The training symbol signals 506 may be prepared for the multiplication operation 508 using a series of operations shown on the left of FIG. 5.

Although not illustrated in FIG. 5, a calculation of an upsampled FFT of the training symbol sequence may be performed in firmware of the receiver device 200. For example, the training symbol sequence may be zero-padded by a factor L, and the result may undergo a m-point FFT operation, where $m = L \cdot N_{train}/(1-R_{OAS})$, where $R_{OAS}$ denotes the ratio used in the OAS operation 234. The upsampled FFT of the training symbol sequence may be stored in hardware, such that it is accessible to the FF equalizer 500.

As described with respect to FIG. 2, the carrier recovery 262 generates an estimate of the carrier frequency offset, herein denoted A. The carrier frequency offset Δ may be accounted for in the training symbol signals 506 that are to be multiplied by the filtered received signals 504. As illustrated in FIG. 5, the upsampled FFT of the training symbol sequence, denoted by 512, may undergo a circular shift operation 516 within hardware of the receiver device 200. The circular shift operation 516 may be equivalent to $K = \text{round}(\Delta N/f_s L)$, where the carrier frequency offset Δ is obtained from the carrier recovery 262, as denoted by the arrow 514, and where N is the number of frequency bins in the FFT. The signals 518 output by the circular shift operation 516 may undergo a decimation operation 520, such that the resulting signals 522 are decimated by L.

Because the training symbols in this example are distributed uniformly in time, the frequency-domain representation of the training symbols is repetitive. Accordingly, the decimated signals 522 may undergo a repetition operation 524 in the hardware in order to generate the entire frequency spectrum. That is, the output 526 of the repetition operation 524 may be equivalent to P repetitions of the decimated signals 522. The repetition operation 524 may be used as an alternative to having the firmware calculate all of the bins, which would use more registers.

The signals 526, which are in the baud domain, may undergo a high-frequency upsampling operation 528, thereby resulting in signals 530 which are in the sampling domain. A complex conjugate operation 532 may then be applied to the signals 530, thereby resulting in the signals 506. The signals 506 correspond to the conjugate training symbol signals $S_x^*(f_i)$ and $S_y^*(f_i)$ in Eq. 6. According to some examples, the signals 506 may also account for the scaling factor $$\frac{P}{N_c \sigma_S^2}$$

in Eq. 6, which may have been incorporated into the upsampled FFT 512 that was stored in the hardware.

For each frequency bin $f_i$ of the received signals $R_{x1}(f_i)$ and $R_{y1}(f_i)$, the multiplication operation 508 generates a respective 2×2 matrix representing an estimate of the channel response corresponding to that frequency bin, denoted $H_{xx}(f_i)$, $H_{xy}(f_i)$, $H_{yx}(f_i)$, and $H_{yy}(f_i)$. Therefore, if there are N frequency bins corresponding to a given time, the signals 410 will comprise N 2×2 matrices. The values characterizing the channel response may be relatively noisy, for example, having a SNR on the order of 0 dB. Accordingly, additional operations may be performed before those values are used to calculate the compensation coefficients $C2_{xx}(f_i)$, $C2_{xy}(f_i)$, $C2_{yx}(f_i)$, and $C2_{yy}(f_i)$ to be used in the filter 560.

A frequency-domain smoothing operation 536 may be applied to the signals 510, thereby resulting in respective signals 538. The frequency-domain smoothing operation 536 may comprise a linear convolution and a decimation in the frequency domain in order to obtain a smoother estimate of the channel response. According to one example, the convolution may be implemented applying two cascaded rectangular window convolutions $W_1(n)$ and $W_2(n)$ to the input signals 510, where $W_1(n) = [1\ 1\ 1\ 1]$ and $W_2(n) = [1\ 1\ 1\ 1]$, such that $W(n) = W_1(n) * W_2(n) = [1\ 2\ 3\ 4\ 4\ 3\ 2\ 1]$. Following decimation, the total number of frequency bins in the output signals 538 would be $N/(4N_c)+1$. For example, given N=1024 bins and $N_c$=32 bins, the output signals 538 would comprise 33 bins. This is merely one example of the frequency-domain smoothing operation 536, and other techniques are contemplated.

A time-domain smoothing operation 540 may be applied to the signals 538, thereby resulting in respective signals 542. For example, the time-domain smoothing operation 540 may comprise a moving average, a zeroth-order fixed-lag Kalman smoother, or a first-order fixed-lag Kalman smoother.

The signals 538 may have a common phase across frequency bins. Although not shown in FIG. 4, the common phase may be estimated and removed prior to the time-domain smoothing operation 540.

Similarly to the input signals 538, the output signals 542 comprise $N/(4N_c)+1$ 2×2 matrices. As a result of the frequency-domain smoothing operation 536 and the time-domain smoothing operation 540, the quality of the signals 542 may be significantly better than the quality of the signals 510. For example, the signals 542 may have a SNR on the order of 20 dB.

The signals 542 represent an estimate of the channel response at given time. That estimate may be used by a coefficient calculation operation 546 to calculate the appropriate compensation coefficients $C2_{xx}(f_i)$, $C2_{xy}(f_i)$, $C2_{yx}(f_i)$, and $C2_{yy}(f_i)$ to be used by the filter 560 in order to compensate for degradations in the received signals 244.

According to one example, the coefficient calculation operation 546 comprises a minimum mean square error (MMSE) filter which calculates compensation coefficients based on minimization of both noise and interference. According to another example, the coefficient calculation operation 546 comprises a zero-forcing filter which calculates compensation coefficients based on minimization of interference only.

The coefficient calculation operation 546 may generate a 2×2 matrix for each of the $N/(4N_c)+1$ frequency bins that it processes at a given time. However, the signals 244 received at the FF equalizer 500 (and the corresponding delayed signals 558) comprise N frequency bins. Thus, in order for the filter 560 to make use of the signals 548 that are output by the coefficient calculation operation 546, these signals must undergo an interpolation operation 550. The interpolation operation 550 linearly interpolates the signals 548 back to the N frequency bins of the signals 510, thereby resulting in the interpolated signals 552, which comprise N 2×2 matrices. The filter 560 may apply the N matrices to the delayed signals 558 to generate the compensated output signals 248, as expressed in Eq. 3.

The FF equalizer 500 may be capable of compensating for various channel impairments, including SOP, PDL, GD, DGD, and small amounts of CD. Furthermore, the feedforward design of the FF equalizer 500 enables the tracking and compensation of very fast changes in the channel response, on the order MHz, such as the SOP transients observed during lightning strikes. For example, the FF equalizer 500 may compensate for impairments varying at a rate of more than 1 MHz.

The calculation of the filter coefficients 552 depends on a cross-correlation of the received signals 254 with known training symbols that are already comprised in the received signals, so the compensation achieved by the FF equalizer 500 may not require any modifications to signals that are transmitted by the transmitter.

According to some examples, the delay applied to the input signals 244 by the delay operation 556 may be set to a value that matches a processing delay associated with the calculation of the filter coefficients 552. In this manner, the filter 560 may apply the filter coefficients 552 that correspond to the precise input signals 244 from which the filter coefficients 552 were calculated. According to other examples, the delay operation 556 may be configured to apply a delay that is larger than the processing delay associated with the filter coefficient calculation. Using a larger delay effectively makes the filter 560 non-causal. For example, one may consider the case where the processing delay for calculation of the filter coefficients 552 is equal to an amount of time L. In the event that the delay operation 556 is configured to apply the same delay L to the signals 244, then signals at a given time t will be used to calculate the filter coefficients 552 that are actually applied to the same time-t signals. However, in the event that the delay operation 556 is configured to apply a larger delay of L+2 to the signals 244, then signals at times t, t+1, and t+2 may be used to calculate the filter coefficients 552 that are applied to the time-t signals. In other words, the coefficients applied by the filter 560 to the delayed input signals 558 may be based on a channel response that is calculated from more recent input signals 244 than the signals to which the filter 560 is currently being applied. The ability to make the filter 560 non-causal may offer significant improvements in the performance of the FF equalizer 500.

It has thus far been assumed that training symbols are uniformly distributed in a burst. In order to achieve the optimal LS channel estimation, the FFT of the training symbol cross-correlation must be a scaled identity matrix over the estimation sub-band. Any two cyclic orthogonal sequences which have the same total energy satisfy this condition for the case of uniform distribution. Due to the up-sampling of the training symbols, the spectrum repeats every P frequency bins. Therefore, the optimality condition is satisfied when $N_c$ is a multiple integer of P. This property may not hold when a different distribution of training symbols is used.

For a Constant Amplitude Zero Auto-Correlation (CA-ZAC) sequence of square length, certain training symbol location mappings may maintain the ideal periodic auto-correlation property, thereby satisfying the optimality condition for the LS channel estimation. Assuming $N_{train}=M^2$, where M is a positive integer number, the first M training symbols may be located anywhere within the first $N_{burst}/M$ symbols of the burst. However, the remainder of the training sequence should follow the same positioning pattern throughout the burst. As a result, the maximum number of consecutive training symbols would be M.

Complementary sequences, which comprise pairs of sequences for which the sum of their out-of-phase aperiodic auto-correlation is equal to zero, may also be used. For the optimality condition to hold, the training symbols may be placed sequentially within a burst, for example, in one cluster. In this case, the transmitter may send bursts with alternating training symbols. Both sequences are stored at the receiver and alternatingly cross-correlated with the received signal. In another example, complementary sequences of length $N_{train}/2$ may be placed in two halves of the burst, such that one half of the burst comprises one half of the training symbols and one half of the payload, and the other half of the burst comprises the remaining half of the training symbols and the remaining half of the payload. Although this example does not achieve the ideal auto-correlation property, a smoothing function may be used to filter the non-zero part of the auto-correlation.

In the event that the training symbols are not uniformly distributed across a burst, it may be computationally expensive to store an LN-point FFT when the zero-padding factor L is large. According to some examples, a linear interpolation may be performed in hardware to reduce the size of the required FFT. In these circumstances, the FF equalizer 500 may be modified (not shown) by removing the decimation 520 and the repetition 524, and incorporating an interpolation operation in their place.

Figure 7:
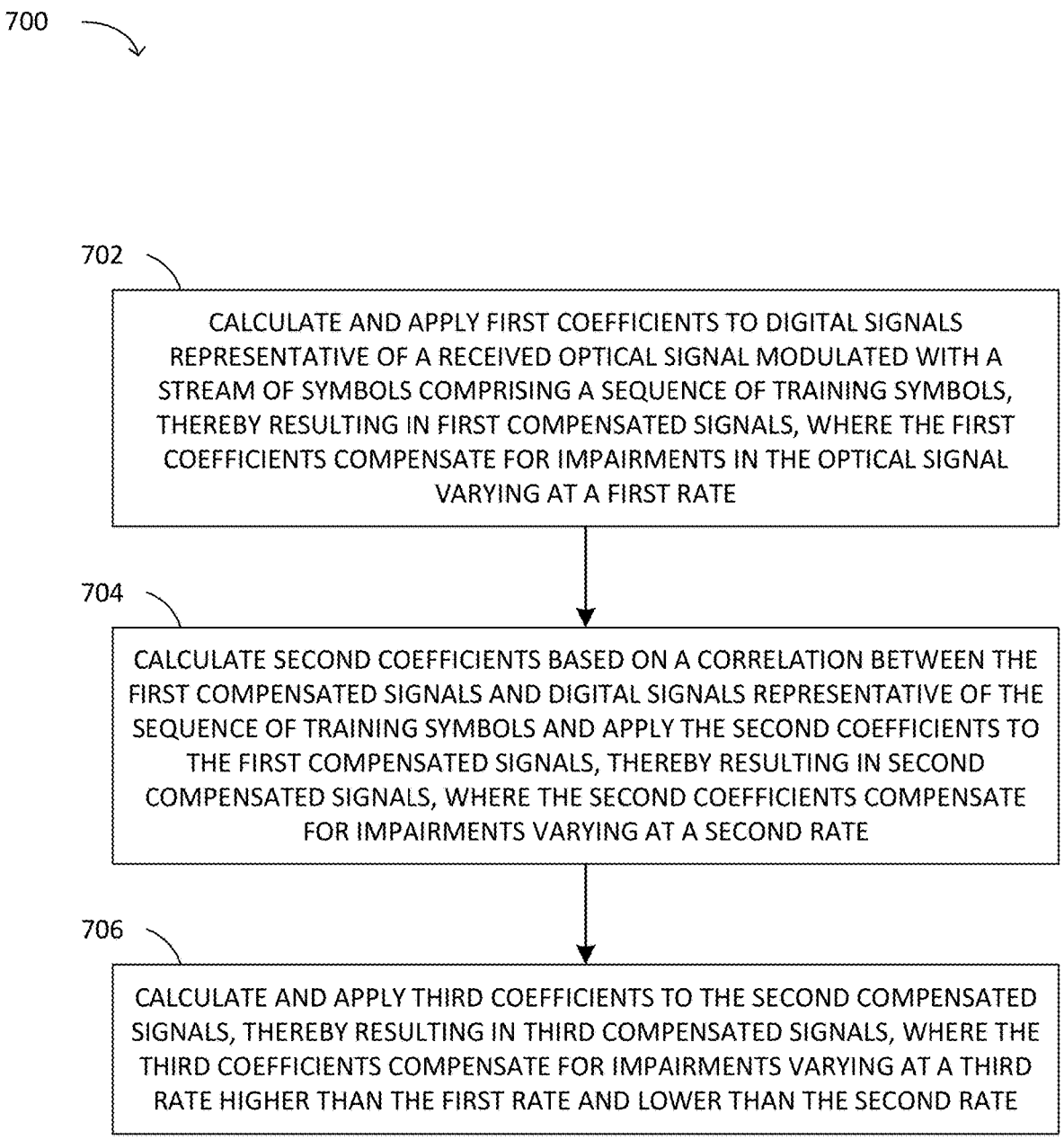
FIG. 7 illustrates an example method for equalization accordance with some examples of the technology disclosed herein.

FIG. 7 illustrates an example method 700 for equalization accordance with some examples of the technology disclosed herein. The method 700 may be performed at a receiver device, such as the receiver device 104 or 200, where the receiver device is configured to receive an optical signal modulated with a stream of symbols comprising a sequence of training symbols. The sequence of training symbols may be uniformly or non-uniformly distributed within a burst.

At 702, first coefficients are calculated and applied to digital signals representative of the received optical signal, thereby resulting in first compensated signals. For example, as described with respect to the static equalizer 242 and 300, the compensation coefficients 304 may be calculated using the coefficient calculation 306, and then applied to the signals 240 using the filter 302, thereby resulting in the signals 244. The first coefficients may compensate for impairments in the optical signal 204 (of which the digital signals 240 are representative), where the impairments vary at a first rate on the order of Hz. Such impairments may include CD. For example, the first rate may be lower than 1 Hz.

At 704, second coefficients are calculated and applied to the first compensated signals calculated at 702, thereby resulting in second compensated signals. For example, as described with respect to the FF equalizer 246 and 500, the compensation coefficients 552 may be calculated using the coefficient calculation 546, and then applied to the signals 244 using the filter 560, thereby resulting in the signals 248. The second coefficients may compensate for impairments in the optical signal 204 (of which the digital signals 244 are representative), where the impairments vary at a second rate on the order of MHz. Such impairments may include SOP transients. For example, the second rate may be higher than 1 MHz.

The calculation of the second coefficients at 704 is based on a cross-correlation of the first compensated signals and digital signals representative of the sequence of training symbols comprised in the stream of symbols used to modulate the optical signal received at the receiver device. For example, as described with respect to the FF equalizer 500, a frequency-domain multiplication operation 508 is applied to the signals 504 (which comprise filtered versions of the first compensated signals 244) and the signals 506 (which are representative of the sequence of training symbols 512).

At 706, third coefficients are calculated and applied to the second compensated signals calculated at 704, thereby resulting in third compensated signals. For example, as described with respect to the FB equalizer 250 and 400, the compensation coefficients 404 may be calculated using the sequence of operations illustrated in FIG. 4, and then applied to the signals 248 using the filter 402, thereby resulting in the signals 252. The third coefficients may compensate for impairments in the optical signal 204 (of which the digital signals 248 are representative), where the impairments vary at a third rate on the order of kHz. Such impairments may include PMD. For example, the third rate may be approximately 1 kHz. According to some examples, the third rate may be higher than the first rate and lower than the second rate.

For simplicity of description and ease of implementation, the preceding examples involve training symbol sequences with regular patterns and integer relationships. However, more intricate patterns and relationships may be used. In some examples, patterns of training symbols may be short, or very long, or of irregular length. The patterns may comprise isolated symbols, clumps of multiple symbols in a row, or a subset of dimensions within one modulated symbol. Irregular patterns may also be used. In some examples, training symbols may be known values of the data signal constellation, some subset of those values, or the choice of a subset of those values, such as a magnitude or sign of the data symbols. In some examples, training symbols may have their own set of electric field values that are distinct from the values of the digital constellation. Orthogonality properties may be desirable in some example, but other relationships may be used.

For simplicity of description and ease of implementation, the preceding examples involve a frequency-domain digital correlation operation. However, useful forms of correlation may be achieved by filtering in the time domain, in the frequency domain, or with other operations or transformations. In some examples, all of the symbols in a data stream may be considered in the correlation operation. In other examples, selected subsets of the data stream may be used. In some examples, time and/or frequency subsets of the data stream that are known to contain much or all of the training information may be used.

According to some examples, the digital symbols representative of the training symbols may comprise a subset of the training symbols, or a subset of the characteristics of the training symbols after some transformation. In the examples described herein, a frequency-domain representation of the training symbols is used, with a fair amount of quantization.

The scope of the claims should not be limited by the details set forth in the examples, but should be given the broadest interpretation consistent with the description as a whole.

What is claimed is:

1. A receiver device configured to receive an optical signal modulated with a stream of symbols comprising a sequence of training symbols, the receiver device comprising:

first equalizer circuitry configured to calculate first coefficients and to apply the first coefficients to digital signals representative of the optical signal, thereby resulting in first compensated signals;

second equalizer circuitry configured to calculate second coefficients based on a correlation between the first compensated signals and digital signals representative of the sequence of training symbols and to apply the second coefficients to the first compensated signals, thereby resulting in second compensated signals; and third equalizer circuitry configured to calculate third coefficients and to apply the third coefficients to the second compensated signals, thereby resulting in third compensated signals, wherein the first, second, and third coefficients compensate for impairments in the optical signal varying at respective first, second, and third rates, wherein the third rate is higher than the first rate and lower than the second rate.

2. The receiver device as claimed in claim 1, wherein the impairments varying at the first rate comprise chromatic dispersion (CD).

3. The receiver device as claimed in claim 1, wherein the impairments varying at the second rate comprise state of polarization (SOP) transients.

4. The receiver device as claimed in claim 1, wherein the impairments varying at the third rate comprise polarization mode dispersion (PMD).

5. The receiver device as claimed in claim 1, wherein the first rate is lower than 1 Hz, wherein the second rate is higher than 1 MHz, and wherein the third rate is approximately 1 kHz.

6. The receiver device as claimed in claim 1, wherein the first, second, and third equalizer circuitry are configured to apply the respective first, second, and third coefficients using frequency-domain linear filtering.

7. The receiver device as claimed in claim 1, wherein the training symbols are uniformly distributed within each burst.

8. The receiver device as claimed in claim 1, wherein the second equalizer circuitry is configured to apply the second coefficients to the first compensated signals non-causally.

9. The receiver device as claimed in claim 1, wherein the second coefficients comprise N 2×2 matrices corresponding to N respective frequency bins of the first compensated signals, wherein N is an integer greater than or equal to two.

10. The receiver device as claimed in claim 1, wherein the second equalizer circuitry is configured to calculate the correlation in the frequency domain.

11. A method performed at a receiver device configured to receive an optical signal modulated with a stream of symbols comprising a sequence of training symbols, the method comprising:

in first equalizer circuitry of the receiver device, calculating first coefficients and applying the first coefficients to digital signals representative of the optical signal, thereby resulting in first compensated signals;

in second equalizer circuitry of the receiver device, calculating second coefficients based on a correlation between the first compensated signals and digital signals representative of the sequence of training symbols and applying the second coefficients to the first compensated signals, thereby resulting in second compensated signals; and in third equalizer circuitry of the receiver device, calculating third coefficients and applying the third coefficients to the second compensated signals, thereby resulting in third compensated signals, wherein the first, second, and third coefficients compensate for impairments in the optical signal varying at respective first, second, and third rates, wherein the third rate is higher than the first rate and lower than the second rate.

12. The method as claimed in claim 11, wherein the impairments varying at the first rate comprise chromatic dispersion (CD).

13. The method as claimed in claim 11, wherein the impairments varying at the second rate comprise state of polarization (SOP) transients.

14. The method as claimed in claim 11, wherein the impairments varying at the third rate comprise polarization mode dispersion (PMD).

15. The method as claimed in claim 11, wherein the first rate is lower than 1 Hz, wherein the second rate is higher than 1 MHz, and wherein the third rate is approximately 1 kHz.

16. The method as claimed in claim 11, wherein applying the first, second, and third coefficients comprises frequency-domain linear filtering.

17. The method as claimed in claim 11, wherein the training symbols are uniformly distributed within each burst.

18. The method as claimed in claim 11, further comprising applying the second coefficients to the first compensated signals non-causally.

19. The method as claimed in claim 11, wherein the second coefficients comprise N 2×2 matrices corresponding to N respective frequency bins of the first compensated signals, wherein N is an integer greater than or equal to two.

20. The method as claimed in claim 11, further comprising in the second equalizer circuitry, calculating the correlation in the frequency domain.

* * * * *